United States Patent [19]

Nakayama et al.

[11] Patent Number: 5,883,637
[45] Date of Patent: Mar. 16, 1999

[54] KERNING METHOD AND A TYPOGRAPHIC APPARATUS UTILIZING SAME

[75] Inventors: Hiroshi Nakayama; Toru Takasawa, both of Tokyo, Japan

[73] Assignee: Dainippon Screen Mfg. Co., Ltd., Kyoto, Japan

[21] Appl. No.: 748,788

[22] Filed: Nov. 14, 1996

[30] Foreign Application Priority Data

Dec. 8, 1995 [JP] Japan .................................. 7-345546

[51] Int. Cl.$^6$ ..................................................... G06F 3/14
[52] U.S. Cl. .......................................... 345/467; 400/304
[58] Field of Search ................................... 345/467, 468, 345/471; 400/304, 76, 63

[56] References Cited

U.S. PATENT DOCUMENTS

| 5,609,427 | 3/1997 | Takasawa et al. ....................... 400/304 |
| 5,768,490 | 6/1998 | Hersch et al. ............................ 345/467 |

FOREIGN PATENT DOCUMENTS

| 50-65223 | 6/1975 | Japan . |
| 2-243343 | 9/1990 | Japan . |
| 3-269490 | 12/1991 | Japan . |

Primary Examiner—Mark K. Zimmerman
Assistant Examiner—Huedung X. Cao
Attorney, Agent, or Firm—Nikaido, Marmelstein, Murray & Oram LLP

[57] ABSTRACT

A kerning method for adjusting a position of an object character relative to an immediately preceding character acting as a reference character, in arranging at least two characters in a predetermined arranging direction based on character frames, i.e. imaginary bodies, including character patterns or faces therein. The method comprises the steps of designating a desired space as a designated facing space between the faces, adding, as part of the faces, correction lines extending in a direction perpendicular to the arranging direction to the respective imaginary bodies of the reference character and the object character, computing a minimum facing space between the reference character and the object character to which the correction lines have been added, computing a space reduction amount for the added object character with respect to the added reference character to bring the minimum facing space into agreement with the designated facing space, and moving the object character toward the reference character by the space reduction amount computed.

20 Claims, 14 Drawing Sheets

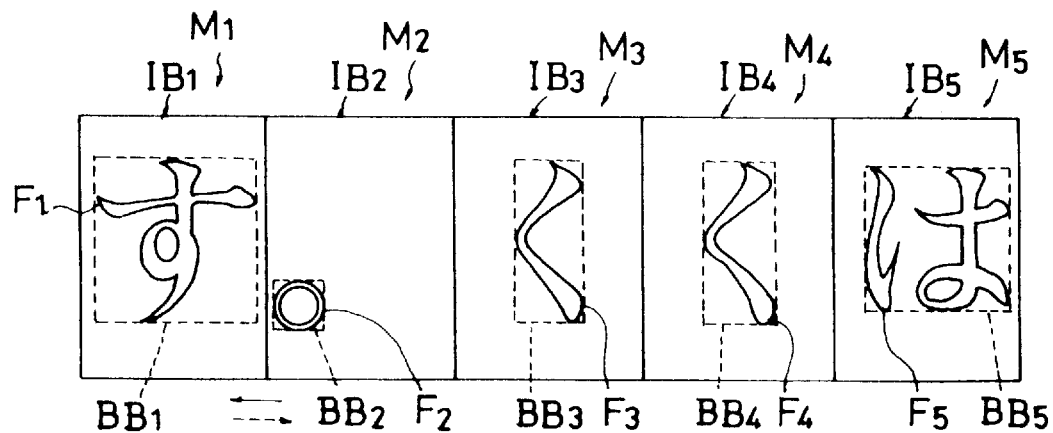
Fig. 5
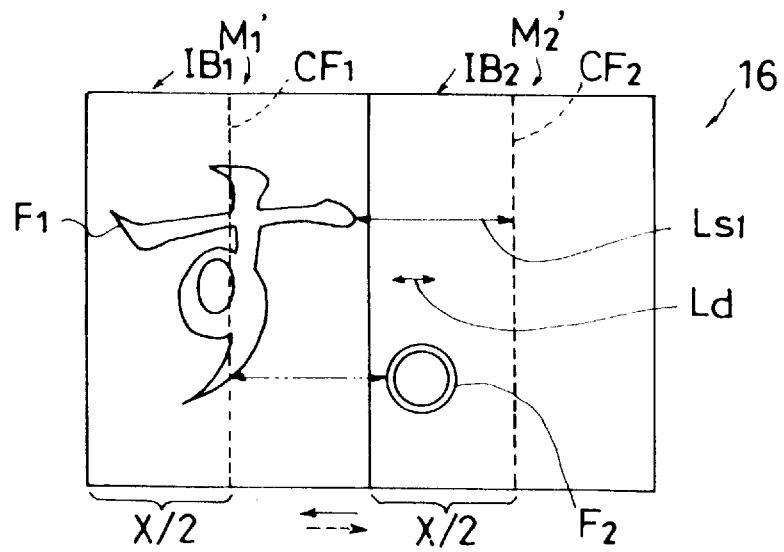
Fig. 6
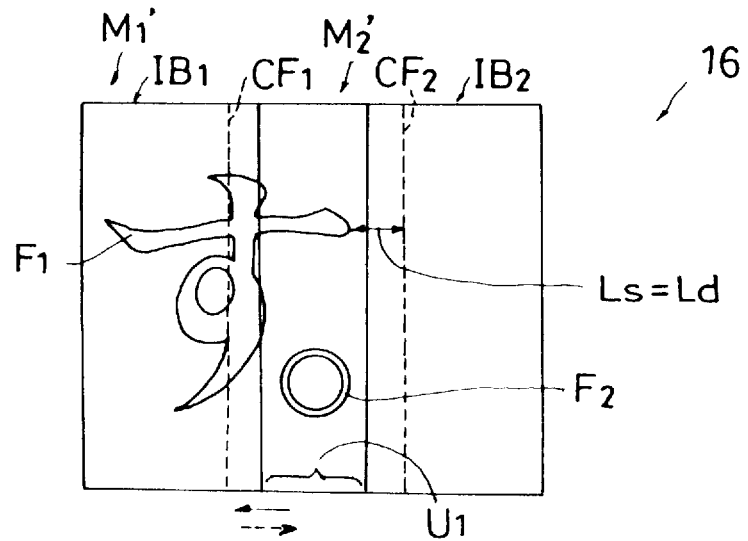

Fig.8

| font name |
|---|
| character size |
| character code of 1st character M1 |
| character code of 2nd character M2 |
| reduction amount U1 for 2nd character M2 |
| character code of 3rd character M3 |
| reduction amount U2 for 3rd character M3 |
| ⋮ |
| character code of nth character Mn |
| reduction amount Un for nth character Mn |

Fig.15A

| middle of imaginary body | middle of face width |
|---|---|
| ○ 、 」 ） | ・ ！ ？ ： |
| 「 （ | ； |

Fig.15B

| middle of imaginary body |
|---|
| ○ 、 」 ） |
| 「 （ |

(1st Embodiment)

(2nd Embodiment)

(2nd Embodiment)

KERNING METHOD AND A TYPOGRAPHIC APPARATUS UTILIZING SAME

BACKGROUND OF THE INVENTION

1 Field of the Invention

This invention relates to typefaces or fonts for typographic apparatus used in desktop publishing (DTP) and the like. More particularly, the invention relates to a kerning method for diminishing space between characters and to a typographic apparatus utilizing this method.

2 Description of the Related Art

In the computer-based electronic typography today, characters handled by typographic apparatus, regardless of the type of characters such as kana, kanji, etc., have faces fitting in frames of a predetermined size. First, components of a character will be described with reference to a schematic view shown in FIG. 1. As used in the following description, the term "characters" refers to numerals and varied signs as well as letters in a narrow sense (such as alphabets and the like) which are used in forming ordinary sentences and words.

The schematic view shows a makeup of kana "<", by way of example.

The configuration of the character is enclosed in an "imaginary body" IB which is a rectangular frame (character frame) representing a minimum character positioning unit. The imaginary body IB has a horizontal length X providing a "character width", and a vertical length Y providing a "character height". Generally, the character width X and the character height Y have the same value.

The imaginary body IB includes a "face" F placed therein which represents a configuration of a character. The face F is composed of dot data based on a combination of dots, or vector data mathematically depicting a shape. The face F has an outermost contour thereof enclosed in a rectangular frame called bounding box (face frame) BB. The bounding box BB has a horizontal length W providing a "face width", and a vertical length H providing a "face height". A comination of face width W and face height H is referred to hereinafter as a face size.

As shown, the difference (space width) between the face width W of the face F disposed inside the imaginary body IB and the character width X of the imaginary body IB provides a front space "a" and a rear space "b". The difference between the face height H and the character height Y provides an upper space "c" and a lower space "d". These spaces are variable with the size and shape of face F enclosed in the imaginary body IB, i.e. variable from character to character.

The bounding box BB sometimes refers to a rectangular frame including suitable margins (side bearings) around the face F. In the following description, the bounding box is regarded as including no such side bearings unless otherwise noted. In the case of the European alphabets, usually, the spaces "a" to "d" are not provided between the imaginary body and bounding box, that is, the imaginary body is identical to the bounding box BB. However, for expediency of description, the spaces "a" to "d" are regarded as being provided for the European alphabets also. This poses no inconvenience in understanding the present invention since the spaces "a" to "d" may be described as zero if no such spaces are provided.

In arranging characters of a character string in a predetermined direction, an object character may be positionally adjusted or kerned relative to an adjacent reference character already fixed in place. In a most typical example of such kerning methods (which is called a pair kerning method), space reduction amounts for predetermined character pairs are provided in the form of a table, a space reduction amount for each pair of a reference character and an object character is read from the table, and the characters are arranged according to the space reduction amount.

In another kerning method, a dot facing space between dot partterns of two character faces is determined in a direction of character arrangement. The characters are then arranged so that the dot facing space agrees with a desired facing space. In a different kerning method developed recently, a facing space between two character faces is computed in a direction of character arrangement. The characters are then arranged so that the facing space agrees with a designated facing space.

The conventional kerning methods noted above have the following disadvantages.

Where the character string includes a small character or sign such as "·" (middle dot) or "." (period), the preceding character (reference character) is too close to "·" or ".", or the succeeding character (object character) comes too close to "·" or ".", thereby impairing visual recognition and appearance. Particularly where the reference character is "す", for example, an object character "." may come too close to "す" to the detriment of visual recognition and appearance.

SUMMARY OF THE INVENTION

This invention has been made having regard to the state of the art noted above, and its object is to provide a practical kerning method and typographic apparatus for arranging characters in a balanced way, without two characters coming too close to each other across a small character or sign included in a character string.

The above object is fulfilled, according to this invention by a kerning method for adjusting a position of an object character relative to an immediately preceding character acting as a reference character, in arranging at least two characters in a predetermined arranging direction based on imaginary bodies including faces therein, the method comprising the steps of:

(a) designating a designated facing space between the faces of the reference character and the object character;

(b) adding, as part of the faces, correction lines extending in a direction perpendicular to the arranging direction to the respective imaginary bodies of the reference character and the object character, to thereby obtain an added reference character having the correction line on the face of the reference character and an added object character having the correction line on the face of the object character;

(c) computing a minimum facing space between the faces of the added reference character and the added object character;

(d) computing a space reduction amount for the added object character with respect to the added reference character to bring the minimum facing space into agreement with the designated facing space; and (e) moving the object character toward the reference character by the space reduction amount.

Correction lines extending in the direction perpendicular to the arranging direction are added, as part of the faces, to the respective imaginary bodies of the reference character and the object character (step (b)). A minimum facing space between the faces of these added reference character and added object character is computed (step (c)). A space reduction amount is computed for the added object character with respect to the added reference character to bring the minimum facing space into agreement with the facing space designated at step (a) (step (d)). The object character is moved toward the reference character by the space reduction amount (step (e)).

Assume, for example, that an object character "." is kerned horizontally with respect to a reference character "す". Where the object character is kerned simply in a way that a minimum facing space computed agrees with a designated facing space. the minimum facing space lies between the lower tail portion of the reference character "す" and the left end of the object character ".", and a space reduction amount is determined accordingly. As a result, the object character "." moves deep into a space under the side bar of the reference character "す". On the other hand, with correction lines added as part of the faces, the minimum facing space between these characters is a space between the right end of the horizontal bar of the reference character "す" and the correction line added to the object character ".". A space reduction amount is determined so that this space agrees with a designated facing space. Thus, the characters are kerned without coming too close to each other.

As noted above, correction lines extending in the direction perpendicular to the arranging direction are added, as part of the faces, to the respective imaginary bodies of the reference character and the object character. A minimum space between the faces of these added reference character and added object character is computed, and a space reduction amount is computed based thereon. Thus, even if a small character is included in a character string, the characters may be arranged in a proper, balanced way, without causing the small character and adjacent characters to come too close to each other.

Preferably, the step (b) above is executed to add the correction lines to middle positions in the arranging direction of the imaginary bodies of the respective characters.

By adding the correction lines to middle positions in the arranging direction of the imaginary bodies of the respective characters, those characters or signs arranged between Chinese characters or Japanese kana and each having a face offset to one side of the imaginary body, such as punctuation marks (e.g. "." and ",") having faces offset leftward, may be arranged closer to preceding characters from middle positions between the preceding and succeeding characters. Thus, the nature of the punctuation marks, i.e. the close link to the preceding characters, may be retained. Other characters or signs such as close parenthesis ")" and close bracket (in Japanese) "」" may also be arranged close to preceding characters to retain their roles. Further, those characters or signs having faces offset rightward, such as open parenthesis "(" and open bracket (in Japanese) "「" may be arranged close to succeeding characters to retain their close link to the succeeding characters.

By adding the correction lines to middle positions in the arranging direction of the imaginary bodies of the respective characters, as noted above, the characters or signs arranged between Chinese characters or Japanese kana and each having a face offset to one side of the imaginary body may be kerned in a way to retain their role in character strings. This natural character arrangement is achieved without causing a small character and adjacent characters to come too close to each other.

It is also preferred that, in the method according to this invention, the step (b) is executed to add the correction lines to middle positions in the arranging direction of the faces of the respective characters.

By adding the correction lines to middle positions in the arranging direction of the faces of the respective characters, the characters may be kerned in a natural way according to the face shapes and without moving the characters too close to each other.

Preferably, the method according to this invention further comprises the step of storing, for different character types, set information indicating whether the correction lines should be added to middle positions in the arranging direction of the imaginary bodies of the respective characters or to middle positions in the arranging direction of the faces of the respective characters, the step (b) being executed to add the correction lines to the reference character and the object character by referring to the set information, whereby the correction lines are added to positions determined according to the character types.

Set information indicating whether the correction lines should be added to middle positions in the arranging direction of the imaginary bodies of the respective characters or to middle positions in the arranging direction of the faces of the respective characters is stored for different character types in advance. The correction lines are added (step (b)), by referring to the set information, to positions determined according to the character types.

For example, correction lines are added to the middle positions of the imaginary bodies in the direction of arrangement for the type of characters having faces arranged leftward in the imaginary bodies, such as ".", ",", "」" and ")", and for the type of characters having faces arranged rightward in the imaginary bodies, such as """, "「" and "(". Correction lines are added to the middle positions of the faces in the direction of arrangement for the type of characters including ".", "?","!", kana and Chinese characters. Such set information is stored in advance. Assume, for example, that the reference character is "す", the object character "." and the next character "<", i.e. "す. <". Then, a correction line is added to the middle of the face of the reference character "す", and a correction line to the middle of the imaginary body of the object character "す". As a result, the characters "す" and "." are arranged close to each other, and the next object character "<" is positioned with an increased space from the next reference character ".". The period "." is placed closer to the preceding character "す" than to the succeeding character "<". Thus, characters may be kerned in a natural way according to face shapes while retaining the nature of a punctuation mark, i.e. a close link to the preceding character.

By referring to the set information stored in advance, as noted above, correction lines are added to selected positions according to the type of characters. Thus, a selection may be made automatically between retention of the nature of a character in a character string and a natural, kerned arrangement according to the face shapes.

Preferably, the correction lines added at the step (b) have a variable width.

The minimum facing space between added reference character and added object character is variable, and so is the space reduction amount, with the width of the correction lines added to the faces of the characters. Thus, an optimal space reduction amount may be obtained by appropriately varying the correction line width.

In another aspect of this invention, there is provided a typographic apparatus utilizing a kerning process for adjusting a position of an object character relative to an immediately preceding character acting as a reference character, in arranging at least two characters in a predetermined arranging direction based on imaginary bodies including faces therein, the apparatus comprising:

a facing space designating unit for designating a designated facing space between the faces of the reference character and the object character;

a correction line adding unit for adding,. as part of the faces, correction lines extending in a direction perpendicular to the arranging direction to the respective imaginary bodies of the reference character and the object character, to thereby obtain an added reference character having the correction line on the face of the reference character and an added object character having the correction line on the face of the object character;

a minimum facing space computing unit for computing a minimum facing space between the faces of the added reference character and the added object character;

a space reduction amount computing unit for computing a space reduction amount for the added object character with respect to the added reference character to bring the minimum facing space into agreement with the designated facing space; and a controller for moving the object character toward the reference character by the space reduction amount.

The correction line adding unit adds correction lines extending in the direction perpendicular to the arranging direction, as part of the faces, to the respective imaginary bodies of the reference character and the object character. The minimum facing space computing unit computes a minimum facing space between the faces of these added reference character and added object character. The space reduction amount computing unit computes a space reduction amount for the added object character with respect to the added reference character to bring the minimum facing space into agreement with the facing space designated through the facing space designating unit. The controller moves the object character toward the reference character by the space reduction amount.

As noted above, correction lines extending in the direction perpendicular to the arranging direction are added, as part of the faces, to the respective imaginary bodies of the reference character and the object character. A minimum space between the faces of these added reference character and added object character is computed, and a space reduction amount is computed based thereon. Thus, even if a small character is included in a character string, the characters may be arranged in a proper, balanced way, without causing the small character and adjacent characters to come too close to each other.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 3 is an explanatory view of a character string to be kerned, which is arranged in a state called "solid matter";

FIG. 5 is an explanatory view showing a process of computing a space reduction amount in the first embodiment;

FIG. 6 also is an explanatory view showing the process of computing a space reduction amount in the first embodiment;

FIG. 8 is a schematic view of character string information;

FIG. 15A and 15B are schematic views of set information;

DESCRIPTION OF THE PREFERRED EMBODIMENTS

Preferred embodiments of the present invention will be described in detail hereinafter with reference to the drawings.

First Embodiment

Figure 2:
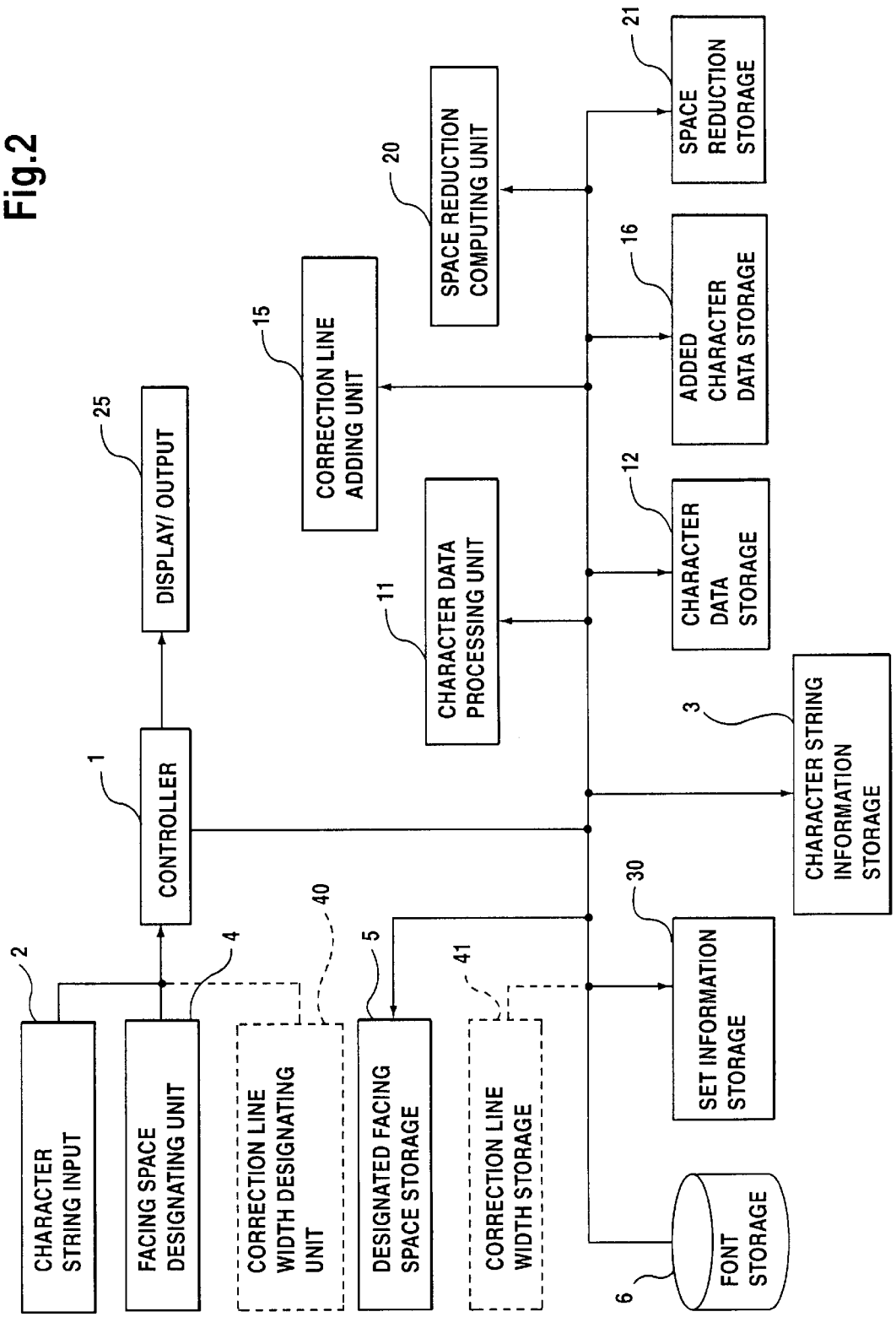
FIG. 2 is a block diagram showing an outline of a typographic apparatus in a first embodiment of this invention.

FIG. 2 is a block diagram showing an outline of an electronic typographic apparatus using a kerning method according to this invention.

FIG. 3 is an explanatory view showing a state called "solid matter" in which a character string to be kerned are arranged with imaginary bodies thereof contacting each other. In this embodiment, a kerning process is performed in arranging five characters, i.e. "す" acting as a first character M1, "." acting as a second character M2, "<" acting as a third character M3, "<" acting as a fourth character M4, and "は" acting as a fifth character M5, sideways (by placing a character at a side of a preceding character).

Numeral 1 in FIG. 2 denotes a controller for executing the kerning method as a principal function thereof. The controller 1 includes a CPU and memories such as a ROM and a RAM not shown. A character string input 2 receives character string data from a medium storing character string data files (including font names, character sizes, character codes, etc.) created on a word processor or the like. The character string data received is stored in a character string information storage 3 under control of the controller 1. The character string data stored in the character string information storage 3 is used as reference by the controller 1. A facing space designating unit 4 is used by the operator to input a space between adjacent characters as a designated facing space, and this facing space is stored in a designated facing space storage 5. The designated facing space stored in the designated facing space storage 5 is used as reference by the controller 1.

The controller 1 reads from a font storage 6 vector font data corresponding to the character string data stored in the character string information storage 3. A character data processing unit 11 forms vector data (e.g. data of size 100×100) corresponding to a designated character size from the vector font data read, or converts the vector data into dot pattern data having a predetermined number of dots (e.g. 100×100 which is in the ratio of 1:1 to the vector data, 50×50 which is in the ratio of 1:2 to the vector data, or 10×10 which is in the ratio of 1:10 to the vector data). The vector data or dot pattern data is stored in a character data storage 12.

The vector font data provides character faces mathematically expressed by functions to represent a character style. The functions give closed letterform areas of black pixels corresponding to the character faces (character patterns), the remaining areas being filled with white pixels. FIG. 3 shows characters expressed by vector data corresponding to a character size. Blank areas within faces (character patterns) F1–F5 ("す", "." and so on) enclosed in imaginary bodies IB1–IB5 are filled with black pixels, and the rest filled with white pixels.

The dot pattern data provides character faces in bit maps (e.g. formed of "1" of binary data). In the dot pattern data, for example, the dots forming character patterns correspond to "1" of binary data, and those forming the other areas to "0" of binary data.

A correction line adding unit 15 adds correction lines, which will be described hereinafter, to the data stored in the character data storage 12 as appropriate. The data with correction lines added thereto is stored in an added character data storage 16. A space reduction computing unit 20, based on the character data having correction lines added thereto and stored in the added character data storage 16, computes a minimum space between the faces of a preceding character acting as a reference character and a succeeding character acting as an object character, and computes a space reduction amount so that this minimum facing space agrees with a designated facing space stored in the designated facing space storage 5. The space reduction amount is stored in a space reduction storage 21. Space reduction amounts stored in the space reduction storage 21 are applied to the character string data stored in the character string information storage 3. The controller 1 transmits, to a display/output unit 25, the character string data stored in the character string information storage 3, to which the space reduction amounts have been applied. Then, the data is displayed on a display device such as a CRT or outputted to an output device such as a printer. The space reduction computing unit 20 corresponds to the minimum facing space computing unit and reduction amount computing unit of this invention.

A set information storage 30 will be described in detail hereinafter. Briefly now, this storage 30 is used to store set information describing ways of adding correction lines according to character types based on certain rules. This set information is inputted by the operator, for example. before performing a kerning process. The set information stored in the set information storage 30 is referred to by the correction line adding unit 15 as necessary.

A correction line width designating unit 40 is used to designate a width of correction lines as described hereinafter. The width of correction lines designated is stored in a correction line width storage 41. The width of correction lines stored in the correction line width storage 41 is referred to by the correction line adding unit 15 to determine a width of correction lines to be added.

Figure 4:
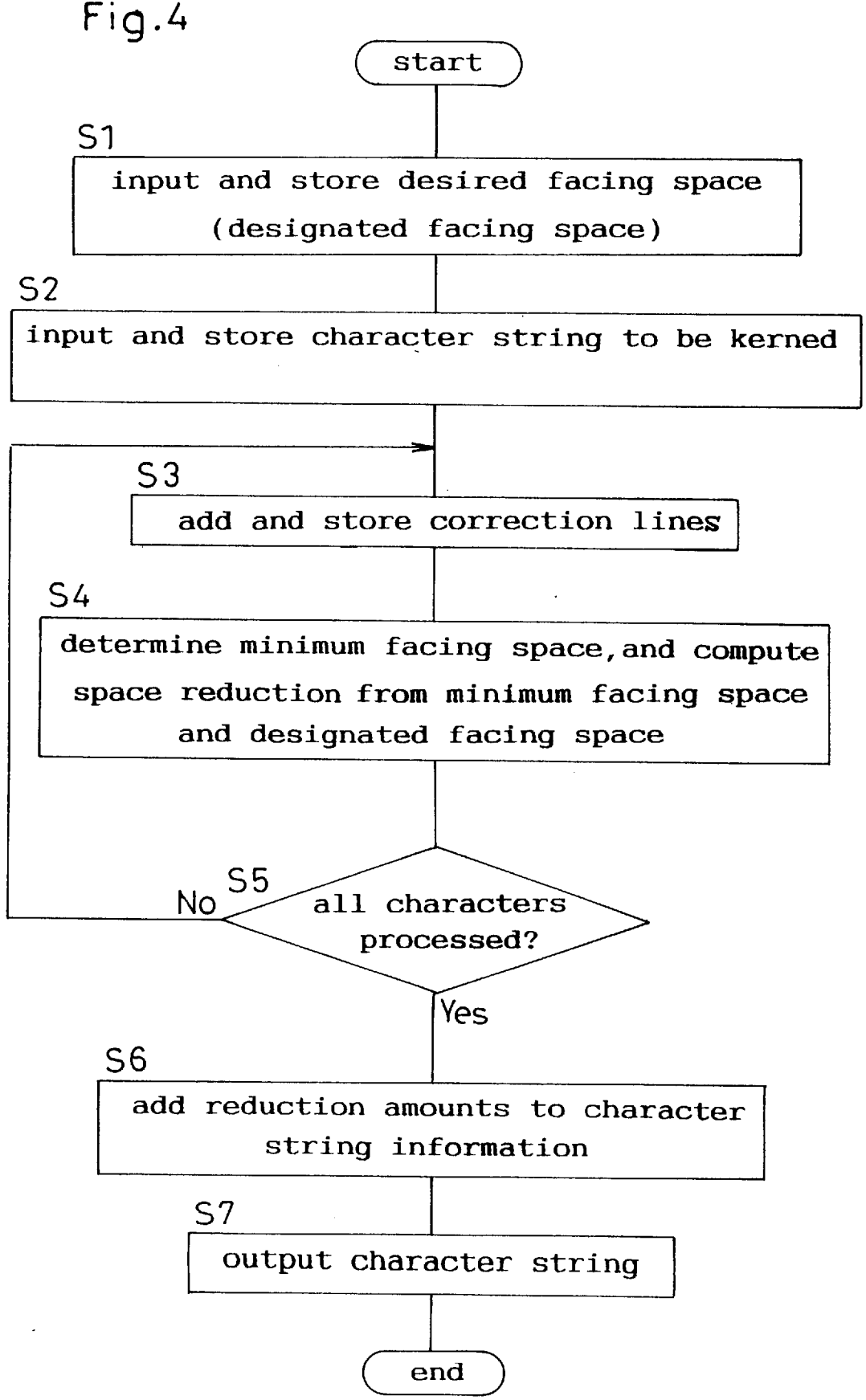
FIG. 4 is a flowchart of a kerning method.

Next, an operation of the above apparatus in kerning the five characters shown in FIG. 3 will be described. FIG. 4 is a flowchart showing an overall sequence of the kerning process.

An outline of the kerning process in the first embodiment is as follows. The first character M1 "す" is regarded as a reference character, and the second character M2 "す" as an object character. Correction lines extending vertically are added to the faces of the respective characters. The second character M2 "." is placed next to the first character M1 "す" with a reduction in space therebetween, so that the minimum space (minimum facing space) therebetween agrees with a designated facing space inputted by the operator. Next, the second character M2 "." is regarded as the reference character, and the third character M3 "<" as the object character. Correction lines extending vertically are added to the faces of the respective characters, and the characters are arranged with a space reduction as described above.

FIG. 3 shows the five characters arranged in a state of "solid matter" (with zero space reduction) to be kerned. In this embodiment, the kerning process is performed in a direction of character arrangement (which is horizontal in this embodiment) for the first character M1 which is "す", the second character M2 which is ".", the third character M3 which is "<", the fourth character M4 which is "<" again, and the fifth character M5 which is "は". Thus, the characters are kerned in the direction indicated by a solid line arrow, the direction indicated by a broken line arrow being the counter kerning direction.

Step S1 (input and store desired facing space):
  The operator inputs a desired space Ld between faces (i.e. a designated facing space as shown in FIG. 5), which is stored in the designated facing space storage 5. Where applicable, the operator may further input "horizontal" indicating the direction of character arrangement, a font name, a character size S and so on. This information, excluding the designated facing space Ld, is added to the character string information stored in the character string information storage 3 at a subsequent step.
Step S2 (input and store character string to be kerned):
  The character string input 2 receives character string data from a medium (e.g. a floppy disk) storing character string data files (including character codes, etc.) created on a word processor or the like. The character string data is stored in the character string information storage 3.

Then, vector font data corresponding to the character string data stored in the character string information storage 3 is read from the font storage 6. Based on the vector data corresponding to the designated character size S, the character data processing unit 11 converts the vector font data to dot pattern data composed of D×D dots, which is stored in the character data storage 12. The larger number of dots D constitutes the dot pattern data, the more desirable it is in relation to the correction lines described hereinafter.

Step S3 (add and store correction lines):

The correction line adding unit 15 reads the first character M1 "す" and second character M2 "." from among the dot pattern data stored in the character data storage 12, and adds correction lines CF1 and CF2 which are faces in the form of lines extending vertically through the middle positions of imaginary bodies IB1 and IB2 (see FIG. 5).

That is, correction lines CF1 and CF2 are faces in the form of "vertical lines" as shown in dotted lines in FIG. 5. These correction lines CF1 and CF2 have dot patterns corresponding to the number of dots constituting the dot pattern data to which each character has been converted.

The first character M1'"す" and second character M2'"." with correction lines CF1 and CF2 added thereto (which are an added reference character and an added object character, respectively) are stored in the added character data storage 16. These correction lines CF1 and CF2 may have a width determined based on the character size S and the number of dots constituting the dot pattern data. In this embodiment, the line width has a minimum value derived from S/D (character size / number of dots). Where the number of dots is an even number, no dots are present in the absolute middle of imaginary bodies IB1 and IB2. In this case, one of the dot columns at either side next to the middle may be regarded as the middle. Preferably, therefore, the character data processing unit 11 performs conversions to dot pattern data having a large number of dots, so that each correction line lies close to the middle of an imaginary body.

Step S4 (determine minimum facing space, and compute and store space reduction amounts):

As part of space reduction computation, the space reduction computing unit 20 computes a space reduction amount for the second character M2'"." acting as the added object character with respect to the first character M1'"す" acting as the added reference character. For the purpose of this computation, the "solid matter" state at the initial stage is regarded as having zero space reduction.

The computation of a space reduction amount for the added object character with respect to the added reference character is not limited to any particular method. The computation is performed in this embodiment as follows.

The computing unit 20 determines a minimum facing space Ls between the faces F1 and CF1 of the first character M1'"す" acting as the added reference character and the faces F2 and CF2 of the second character M2'"." acting as the added object character, i.e. a minimum facing space $Ls_1$ among facing spaces between the two characters as seen in directions parallel to the direction of space reduction. As shown in FIG. 5, the minimum facing space $Ls_1$ is a space between the right edge of the horizontal bar of the first character M1'"す" acting as the added reference character and the correction line CF2 of the second character M2'"." acting as the added object character. Specifically, facing spaces are derived from font information of the first character M1'"す" and second character M2'".", determined by horizontal scans over the character data, or determined between dots forming the faces and horizontally opposed to each other. The minimum facing space $Ls_1$ is determined by selecting a minimum from among these facing spaces. In the prior art, the minimum facing space is found in a position shown in a two-dot-and-dash line.

A space reduction amount for the second character M2'"." acting as the added object character with respect to the first character M1'"す" acting as the added reference character is obtained by subtracting designated facing space Ld from minimum facing space $Ls_1$. Thus, space reduction amount U1 =minimum facing space $Ls_1$–designated facing space Ld. That is, the space reduction amount U1 is determined to bring the minimum facing space $Ls_1$ into agreement with the designated facing space Ld. FIG. 6 schematically shows a state reflecting the above. The space reduction amount U1 obtained as above is stored in the space reduction storage 21. When the space reduction amount U1 has a negative value, the second character M2 "." is moved away from the first character M1 "す", i.e. kerned in the counter kerning direction (or expanded).

Step S5 (check if all characters have been processed):

The correction line adding unit 15 checks with the character data storage 12 to determine whether or not all characters have been processed. In this example, the operation returns to step S3 to repeat the foregoing process for the third character M3 "<" acting as the object character with respect to the second character M2 "." acting as the reference character. In this way, space reduction amounts Un (n being 2 to 4 in this embodiment) are determined for the respective characters.

Figure 7A:
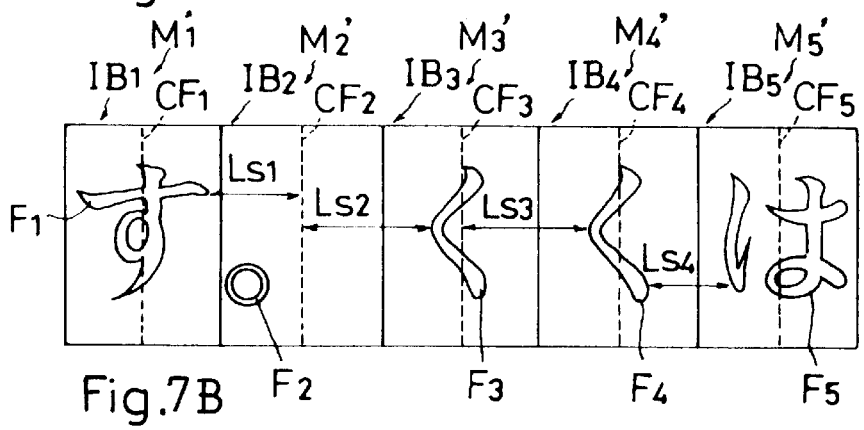
FIGS. 7A and 7B also are explanatory views showing the process of computing space reduction amounts in the first embodiment.
Figure 7B:
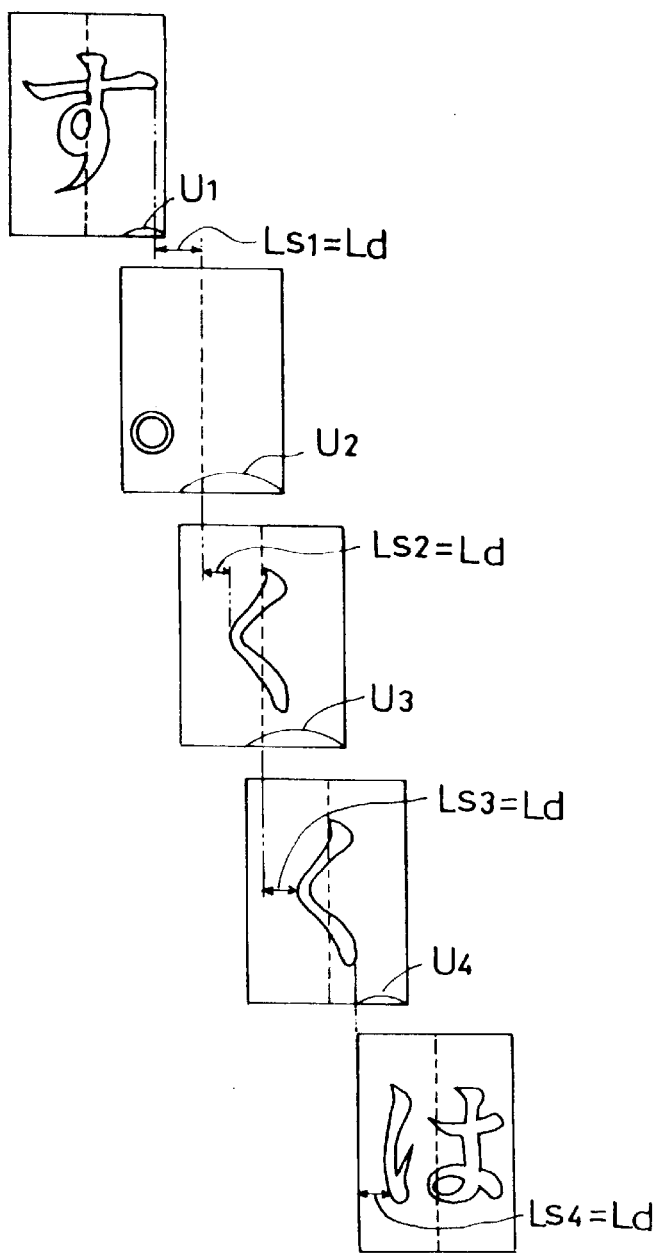

As a result of computation of space reduction amounts U2–U4, as shown in FIG. 7B, each of minimum facing space $Ls_2$ between the second character M2'"." and the third character M3'"<", minimum facing space $Ls_3$ between the third character M3'"<" and the fourth character M4'"<", and minimum facing space $Ls_4$ between the fourth character M4'"<" and the fifth character M5'"は", equals the designated facing space Ld. The space reduction amounts U2–U4 also are stored in the space reduction. storage 21.

Step S6 (add space reduction amounts to character string information):

The space reduction amounts U1–Un are added to the respective character codes in the character string information stored in the character string information storage 3. FIG. 8 shows the space reduction amounts U1–Un included in the character string information.

Figure 9:
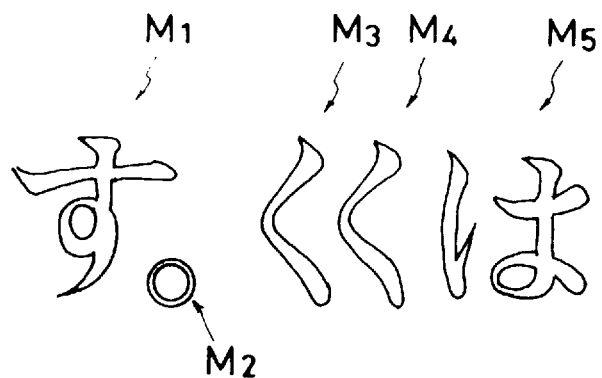
FIG. 9 is a view showing an arrangement of the character string resulting from the computation of space reduction amounts in the first embodiment.

Step S7 (output character string):

After the above process, the controller 1 refers to the character string information storage 3 and font storage 6, and outputs the finally adjusted character string to the display/output unit 25. Specifically, the second character M2 "." acting as the object character is arranged with space reduction amount U1 with respect to the first character M1 "す" acting as the reference character. The third character M3 "<" acting as the object character is arranged with space reduction amount U2 with respect to the second character M2 "." acting as the reference character. The fourth character M4 "<" acting as the object character is arranged with space reduction amount U3 with respect to the third character M3 "<" acting as the reference character. The fifth character M5 "は" acting as the object character is arranged with space reduction amount U4 with respect to the fourth character M4 "<" acting as the reference character. FIG. 9 schematically shows the characters M1–M5 arranged with the space reduction amounts U1–U4.

Figure 10:
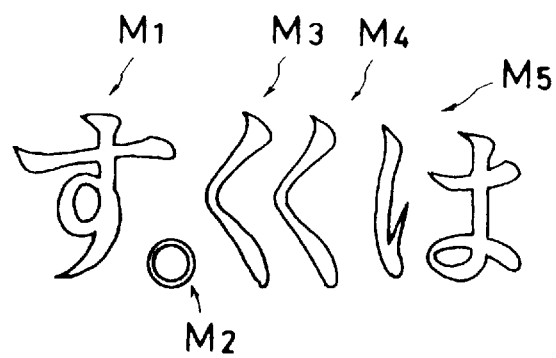
FIG. 10 is a view showing an arrangement of the character string resulting from computation of space reduction amounts in the prior art.

For comparison, FIG. 10 shows the same characters arranged by a conventional kerning method. In the conventional arrangement shown in FIG. 10, the second character M2 "." lies deep into the first character M1 "ず" In the kerning method according to this invention, the encroachment is diminished as seen from FIG. 9. It will also be seen that this invention diminishes the encroachment upon the second character M2 "." by the third character M3 "<", and upon the third character M3 "<" by the fourth character M4 "<". This is because, in the kerning method according to this invention, as shown in FIG. 7A, the minimum facing space between the first character M1 "ず" and second character M2 "." is not (the two-dot-and-dash line in FIG. 5) between the lower tail portion of the face of "ず" and the face of ".", but is the space Ls₁ between the face of the horizontal bar of the first character M1'"ず" to which a correction line has been added and the correction line CF2 of the second character M2'".". Similarly, the minimum facing space between the second character M2'"." and third character M3 "<" is the space Ls₂ between the correction line CF2 of the second character M2'"." and the face of the third character M3'"<". However, the kerned arrangement provides no encroachment upon the fourth character M4 "<" by the fifth character M5 "は". The minimum facing space between these characters remains unchanged after adding the correction lines. Thus, the minimum facing space Ls₄ is the same in this invention as in the prior art.

Figure 1:
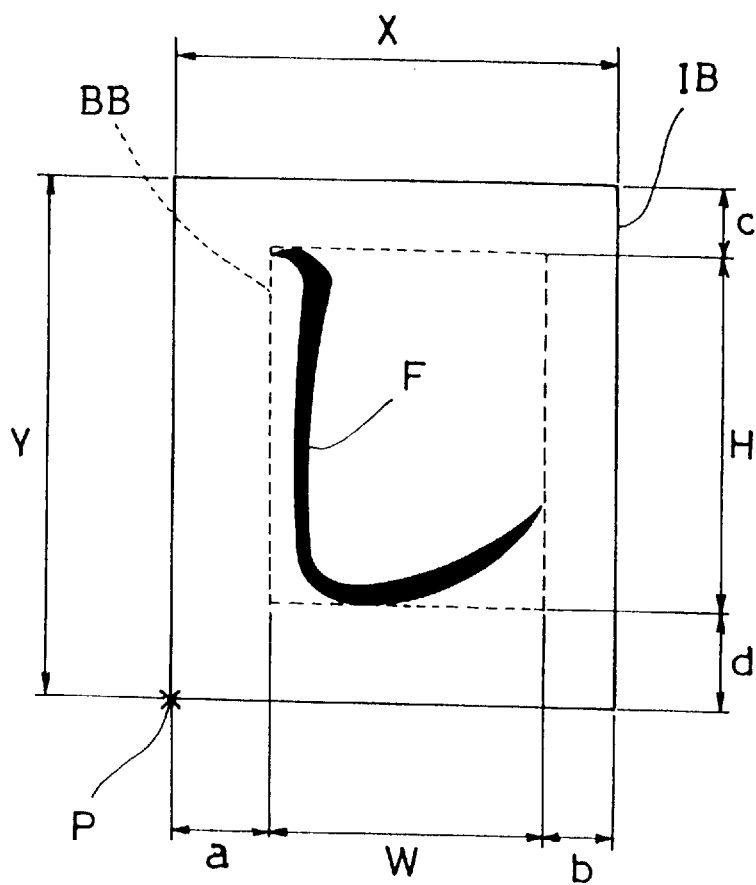
FIG. 1 is a schematic view of a character makeup.

That is, when a minimum facing space between two characters to which correction lines have been added touches one of the correction lines added, the minimum facing space occurs in a position different from where it is before the correction lines are added. Consequently, the minimum facing space becomes less than in the prior art, thereby diminishing the space reduction amount to suppress encroachment. Examples in which the minimum facing space between two characters touches one of the correction lines added are found with characters or signs, such as the period "." and letter "<" in this embodiment, in which the face width W in the direction of character arrangement (FIG. 1) is small, i.e. characters having small faces.

Thus, even if a small character is included in a character string, the characters may be arranged in a proper, balanced way, without causing the small character and adjacent characters to come too close to each other.

In the first embodiment described above, each correction line is added to the middle position in the width of a character in the direction of character arrangement ("sideways"), i.e. the middle position in the horizontal length X of the imaginary body (halfway along the character width X) of a character. A different example will be described hereinafter, in which each correction line is added to the middle position of the face of a character, i.e. the middle position in the horizontal length W of the bounding box (halfway along the face width W) of a character.

Second Embodiment

The second embodiment will be described with reference to FIGS. 11 through 14. The construction of the apparatus and its processing sequence are the same as in the first embodiment, and will not be described again. In the block diagram shown in FIG. 2, the correction line adding unit 15 adds a correction line to the middle position in the face width W of each of the reference character and object character. In the flowchart shown in FIG. 4, step S3 is executed to add correction lines as noted above.

Figure 11:
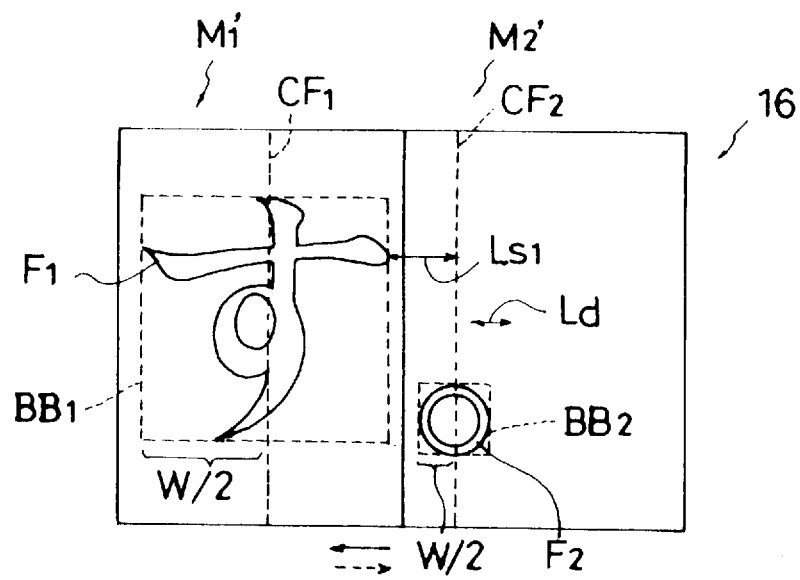
FIG. 11 is an explanatory view showing a process of computing a space reduction amount in a second embodiment.
Figure 12:
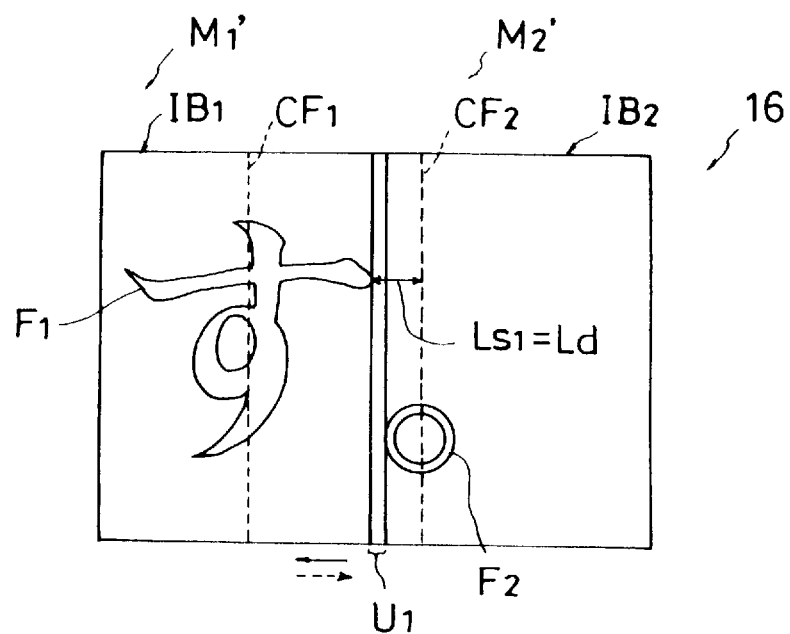
FIG. 12 also is an explanatory view showing the process of computing a space reduction amount in the second embodiment.

FIG. 11 shows correction lines CF1 and CF2 added to middle positions in horizontal lengths W of bounding boxes BB1 and BB2 of the first character M1 "ず" and second character M2 ".", respectively (i.e. first character M1 "ず" acting as an added reference character, and second character M2'"." acting as an added object character). The minimum facing >space Ls₁ between the first character M1'"ず" acting as the added reference character and the second character M2'"." acting as the added object character is a space between the right edge of the horizontal bar of the face F1 of the first character M1'"ず" and a portion, horizontally opposed thereto, of the correction line CF2 added to the second character M2'".". A space reduction amount U1 is determined to bring the minimum facing space Ls₁ into agreement with the designated facing space Ld as shown in FIG. 12. The subsequent process is the same as in the first embodiment.

Figure 13A:
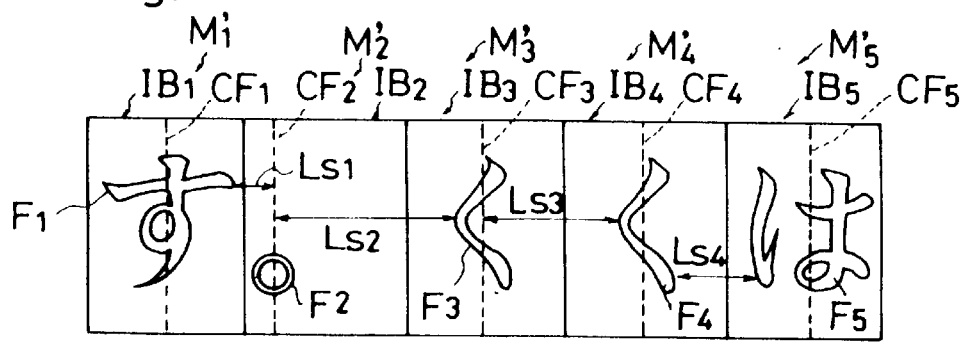
FIGS. 13A and 13B also are explanatory views showing the process of computing space reduction amounts in the second embodiment.
Figure 13B:
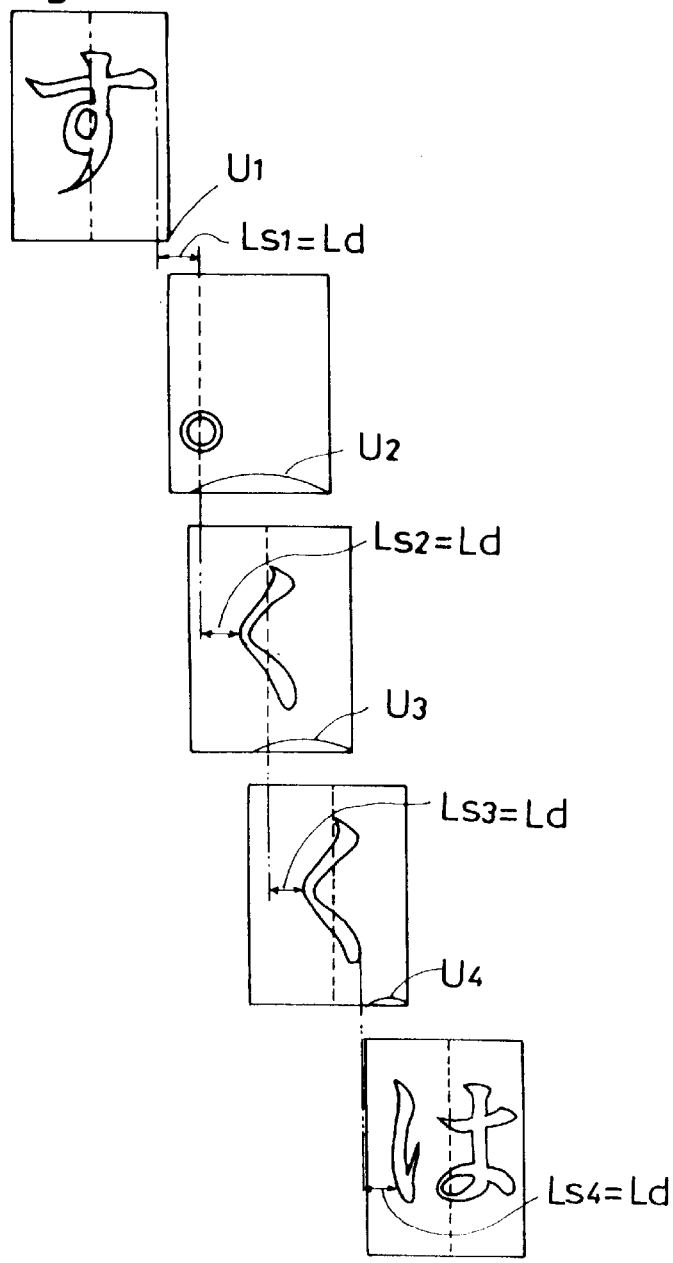

The above process is carried out to determine space reduction amounts U2–U4 between the second character M2'"." and the third character M3'"<", between the third character M3'"<" and the fourth character M4'"<", and between the fourth character M4'"<" and the fifth character M5'"は". FIG. 13B schematically shows this state;.

Figure 14:
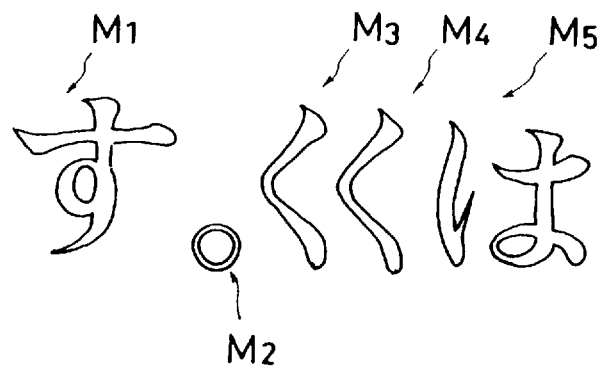
FIG. 14 is a view showing an arrangement of the character string resulting from the computation of space reduction amounts in the second embodiment.

FIG. 14 schematically shows the characters M1–M5 arranged with the space reduction amounts U1–U4. As seen from this figure and FIG. 10 showing the conventional example, the encroachment upon the first character M1 "ず" by the second character M2 "." is diminished. It will also be seen that this embodiment diminishes the encroachment upon the second character M2 "." by the third character M3 "<", and upon the third character M3 "<" by the fourth character M4 to "<". This is because, in the kerning method according to this invention, as shown in FIG. 13A, the minimum facing space between the first character M1 "ず" and second character M2 "." is the space Ls₁ between the right edge of the horizontal bar of the first character M1'"ず" to which a correction line has been added and the correction line CF2 of the second character M2'".", i.e. between the right edge of the horizontal bar of the first character M2'"." and the middle of the face of the second character M2'".". Similarly, the minimum facing space between the second character M2 "." and third character M3 "<" is the space Ls₂ between the correction line CF2 of the second character M2'"." and the face of the third character M3'"<". However, the kerned arrangement provides no encroachment upon the fourth character M4 "<" by the fifth character M5 "は". The minimum facing space Ls₄ between these characters is the same as in the first embodiment and the prior art.

That is, as noted hereinbefore, when a minimum facing space between two characters to which correction lines have been added touches one of the correction lines added, the minimum facing space occurs in a position different from where it is before the correction lines are added. Consequently, the minimum facing space becomes less than in the prior art, thereby diminishing the space reduction amount to suppress encroachment. comparison is made here between FIG. 9 showing the first embodiment and FIG. 14 showing the second embodiment. In the first embodiment, the second character M2 "." is arranged close to the preceding, first character M1 "ず". In the second embodiment, the second character M2 "." is arranged close to the succeeding, third character M3 "<".

However, the second character M2 "." is the period indicating the end of a sentence (or character string). In this sense, the arrangement in the first embodiment is preferable to that in the second embodiment. The difference arises from the position of correction line CF2 added to the second character M2 ".", i.e. the middle of imaginary body IB2 or the middle of face F2. It will be appreciated that the position of a correction line added should be varied according to the type of character. That is, a correction line should be set to the middle of the imaginary body for a character having a face offset to one side of the imaginary body in a direction of character arrangement, such as period ".", comma (in Japanese) "、", open bracket (in Japanese) "「" or close bracket (in Japanese) "」". A correction line should be set to the middle of the face for a character having the face lying in the middle of the imaginary body, such as middle dot "·", exclamation mark "!", question mark "?", colon ":", semi-colon "; ", or other characters. Thus, the former character type may be placed not too close to an adjacent character while retaining its role in a character string.

The positions to which correction lines are added may be switched in the following way.

As shown in FIG. 15A, the set information storage 30 stores set information including two types of characters classified in advance, which are the type having a correction line added to the center of the imaginary body, and the type having a correction line added to the center of the face width. When adding correction lines, the correction line adding unit 15 refers to this setting information, and switches positions to which the correction lines are to be added at step S3 described hereinbefore. For characters not included in the set information, the functions of the correction line adding unit 15 may be set in advance so that correction lines are added to the middle of the face width. The set information shown in FIG. 15A actually contains character codes.

The set information may take the form shown in FIG. 15B. This information includes only the type of characters for which correction lines are to be added to the middle of the imaginary body width. For other characters, the functions of the correction line adding unit 15 are set to add correction lines to the middle of the face width.

The above set information may be stored in advance in the set information storage 30, and the correction line adding positions may be switched based on the set information. In this way, the inconvenience of a small character lying too close to an adjacent character may be avoided while retaining its role in a character string. Thus, characters may be arranged with natural balance.

The foregoing description is directed to the Japanese language. The case of European characters will be described hereinafter with reference to FIGS. 16 through 18.

Figure 16:
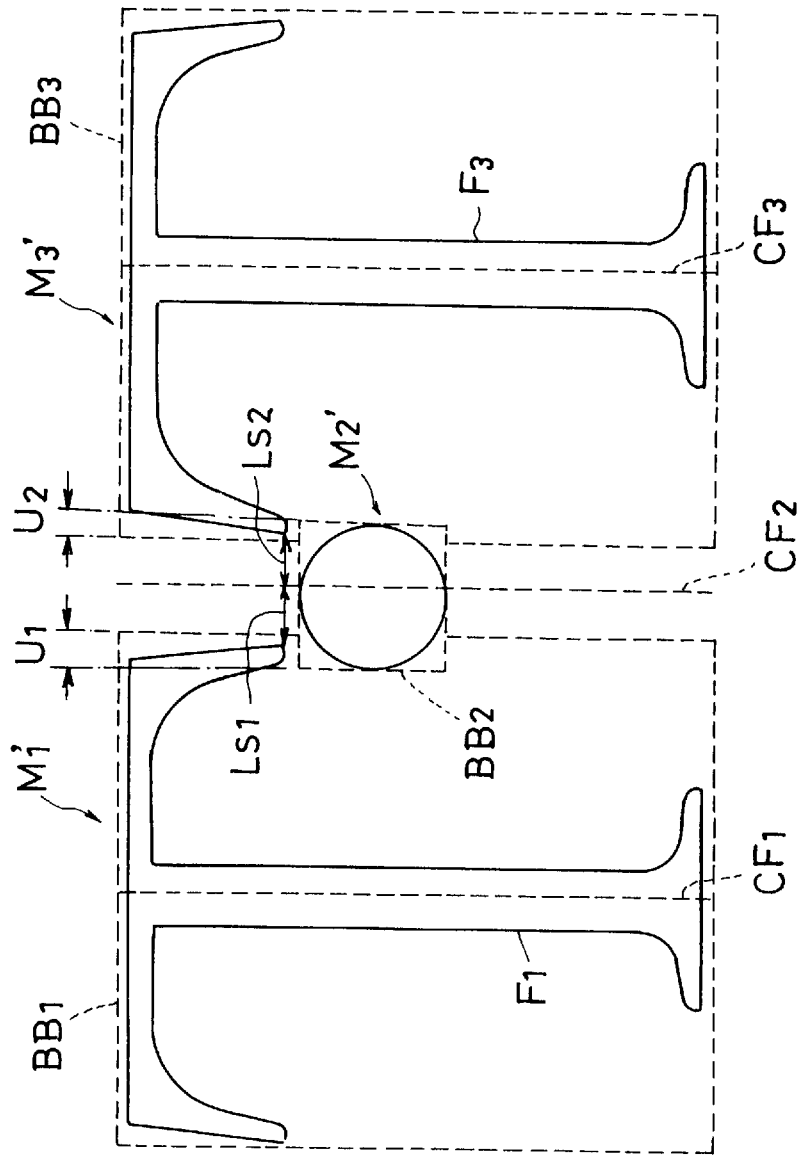
FIG. 16 is an explanatory view showing a process of computing a space reduction amount for a European character string in the second embodiment.
Figure 17:
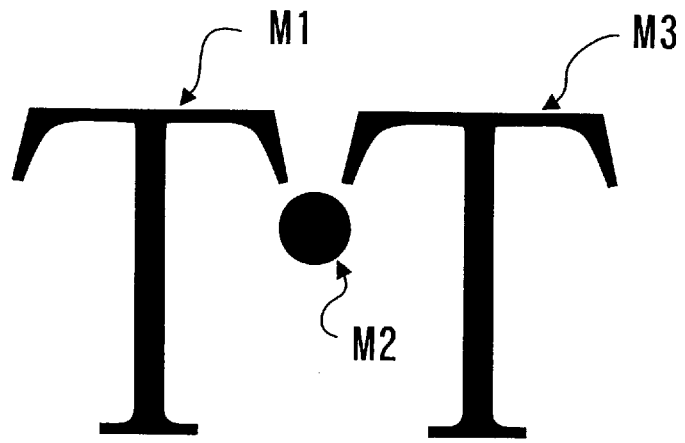
FIG. 17 is a view showing an arrangement of the European character string resulting from the computation of space reduction amounts in the second embodiment.
Figure 18:
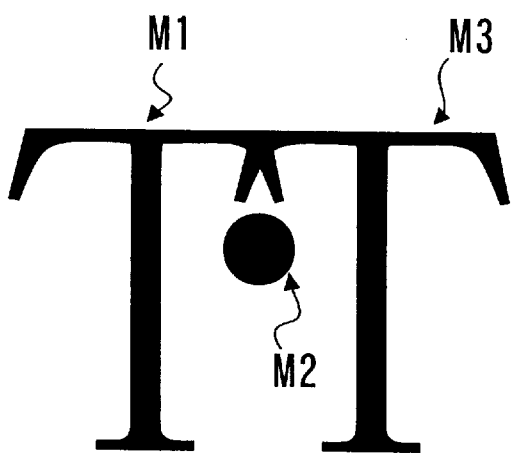
FIG. 18 is a view showing an arrangement of the European character string resulting from a computation of space reduction amounts in the prior art.

FIG. 16 shows the second embodiment applied to European characters in FIG. 17, which include a first character M1 "T", a second character M2 "·" and a third character M3 "T". FIG. 16 shows only the bounding boxes and interiors of the characters, without the imaginary bodies. FIG. 17 shows only the faces.

The first character M1 "T", second character M2 "·" and third character M3 "T" have correction lines CF1, CF2 and CF3 added, as described hereinbefore, to middle positions in horizontal lengths W of bounding boxes BB1, BB2 and BB3, respectively. These characters are then the first character M1'"T", second character M2'"·" and third character M3'"T" acting as the added reference character and added object character.

The minimum facing space Ls. between the first character M1'"T" acting as the added reference character and the second character M2'"·" acting as the added object character lies between the right edge of the horizontal bar of the face F1 of the first character M1'"T" and a horizontally opposed portion of the correction line CF2 added to the second character M2'"·".

A space reduction amount U1 is determined to bring the minimum facing space Lsi into agreement with a designated facing space Ld. The subsequent process is the same as in the first embodiment. Next, a similar process is carried out to determine a space reduction amount U2 between the second character M2'"·" acting as the added reference character and the third character M3'"T" acting as the added object character.

FIG. 17 shows the second character "·" and third character "T" arranged with the space reduction amounts U1 and U2 with respect to the first character "T". A comparison is made between FIG. 17 and FIG. 18, the latter showing results of a conventional kerning process. It will be seen that the process according to this invention diminishes the encroachment upon the first character "T" by the second character "·", and the encroachment upon the second character "·" by the third character "T".

This is because, in the kerning method according to this invention, as shown in FIG. 16, the minimum facing space Ls. between the first character M1 "T" and second character M2 "·" lies between the right end of the horizontal bar in the face F1 of the first character M1'"T" to which correction line CF1 has been added and the correction line CF2 of the second character M2'"·". Similarly, the minimum facing space Ls$_2$ between the second character M2 "·" and third character M3 "T" lies between the correction line CF2 of the second character M2'"·" and the left end of the horizontal bar in the face F3 of the third character M3'"T" to which correction line CF3 has been added.

Third Embodiment

A process of correcting the arrangement of the character string kerned in the first embodiment will be described next with reference to FIGS. 19 through 21.

Figure 19:
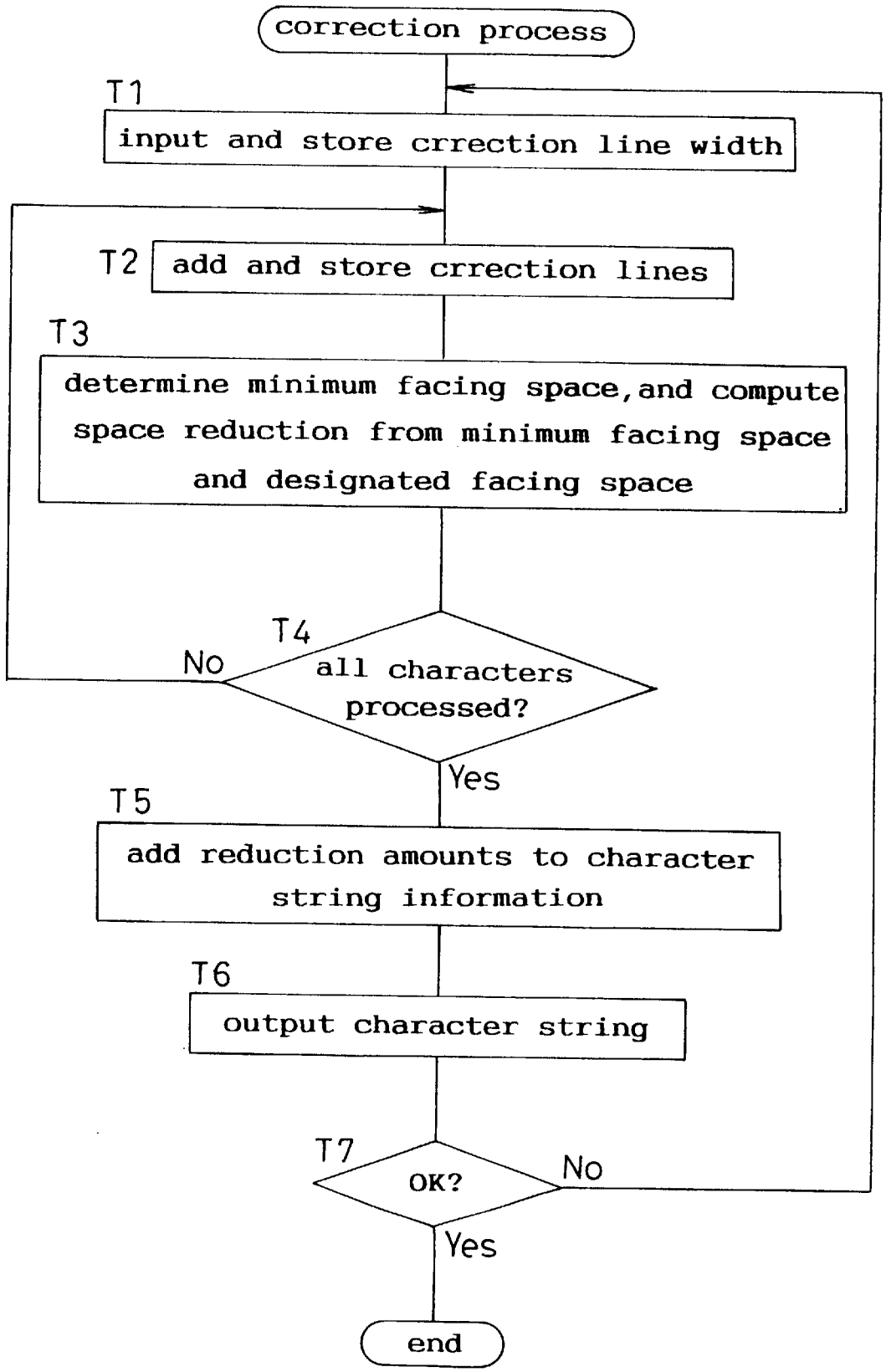
FIG. 19 is a flowchart of a correction process in a third embodiment.
Figure 20A:
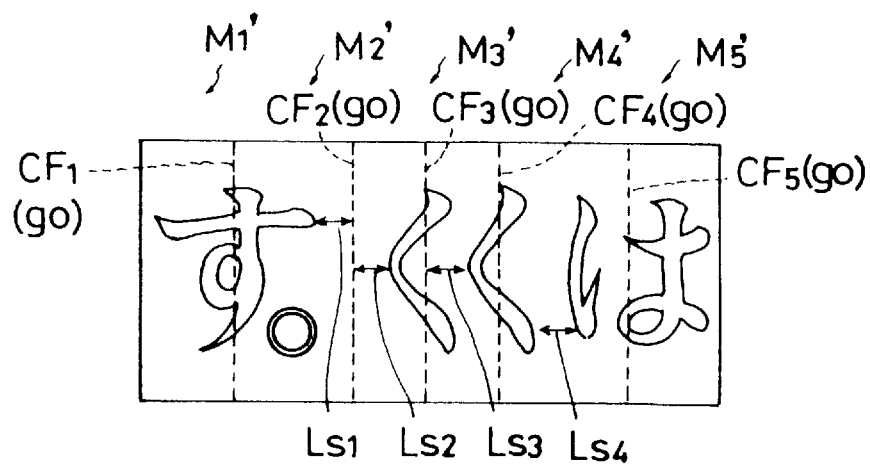
FIGS. 20A through 20C are explanatory views of the correction process.
Figure 20B:
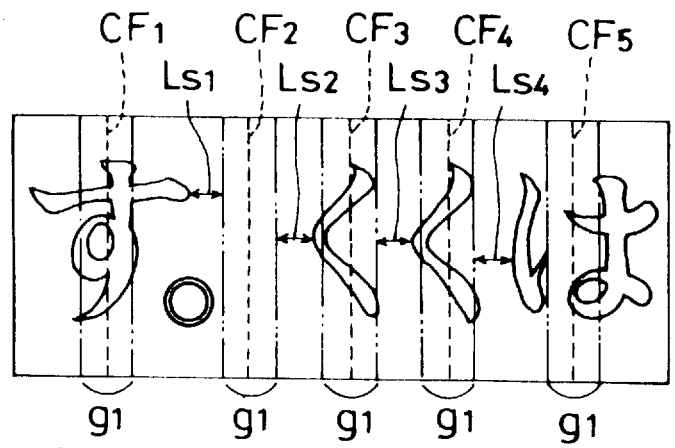
Figure 20C:
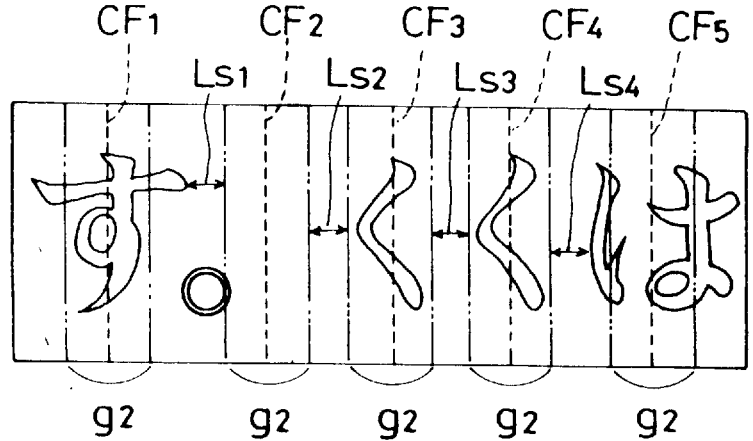
Figure 21A:
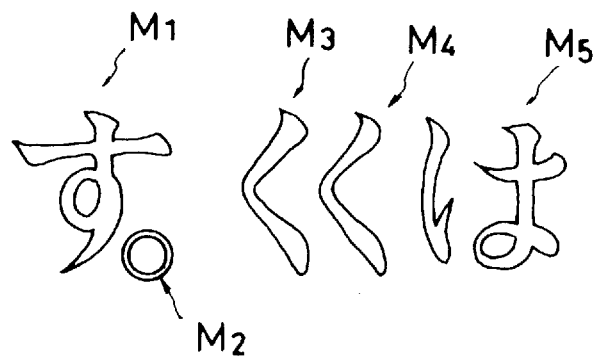
FIGS. 21A through 21C are views showing arrangements of a character string resulting from the correction process.
Figure 21B:
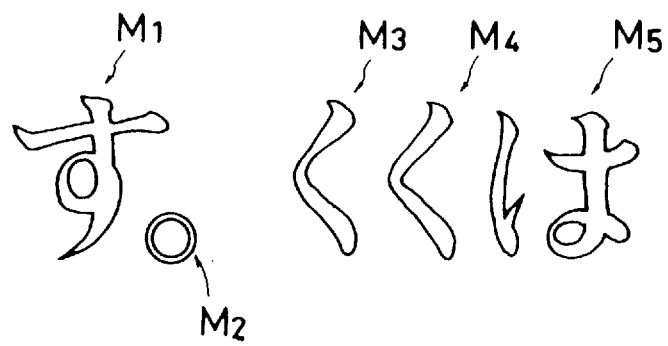
Figure 21C:
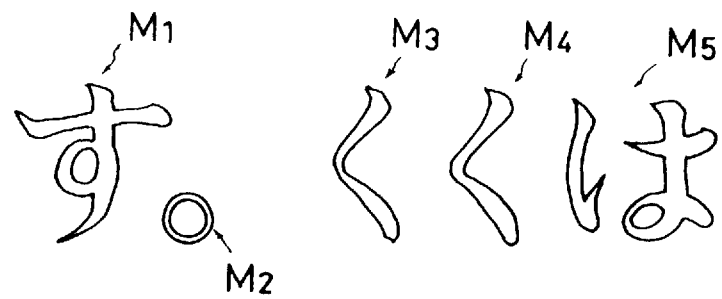

FIG. 19 is a flowchart of the correction process. FIGS. 20A through 20C show the character strings having three types of correction lines added thereto. FIGS. 21A through 21C are schematic views showing arrangements of the character string resulting from the correction process with the three types of correction lines added. The correction process described hereinafter is performed mainly when the characters lie too close to each other after the kerning process as noted hereinbefore.

FIG. 20A shows the character string "す.<<は" after the kerning process in the first embodiment described hereinbefore. The correction lines CF1–CF5 have a line width which is a minimum width determined by character size S and the number of dots constituting the dot pattern data, i.e. derived from S/D (character size / number of dots). This width is regarded here as $g_0$.

Step T1 (input and store correction line width):

The operator inputs a desired correction line width g through the correction line width designation unit 40. This correction line width g is stored in the correction line width storage 41. The correction line width g may be the minimum width $g_0$ multiplied by an even number, for example. It is assumed here that a correction line width $g_1$ (broader than the correction line width $g_0$) has been inputted.

Step T2 (add and store correction lines):

The correction lines CF1 and CF2 having the width $g_1$ inputted are added to the first character M1 "す" and second character M2 ".", respectively, as described in the first embodiment.

Step T3 (determine minimum facing space, and compute and store space reduction amounts):

As described in the first embodiment, a minimum facing space $Ls_1$ is determined, and a space reduction amount is determined to bring the minimum facing space $Ls_1$ into agreement with the designated facing space Ld.

Step T4 (check if all characters have been processed):

Whether or not all characters have been processed is checked, and the operation is repeated to process all characters.

When all characters have been processed, the space reduction amounts determined are added to the character string information (step T5), and the character string is outputted to the display/output unit 25 (step T6). The operator observes the display (FIG. 21B) to determine if all the characters have been kerned properly (step T7). The process is terminated if the result is satisfactory. If not, the operation returns to step T1 to input a new correction line width $g_2$ (broader than correction line width $g_1$) and repeat the above steps. It is assumed that the new correction line width results in what is shown in FIG. 20C.

FIGS. 21A through 21C show outputs of the kerned arrangement based on correction line widths $g_0$, $g_1$ and $g_2$, respectively. Naturally, the minimum facing spaces $Ls_1$–$Ls_4$ (FIGS. 20A–20C) are equal to the designated facing space Ld. However, since correction lines CF1–CF5 have varied widths ($g_0<g_1<g_2$), the minimum facing spaces (excluding the correction lines) are enlarged progressively. That is, comparing FIG. 21A and FIG. 21B, the spaces are enlarged between the first character M1 "す" and second character M2".", between the second character M2 "." and third character M3 "<" and between the third character M3 "<" and fourth character M4 "<". The space between the fourth character M4 "<" and fifth character M5 "は" is slightly enlarged.

A comparison between FIG. 21B and FIG. 21C also shows that the spaces between the respective characters are enlarged as above. Thus, the width of the correction lines may be varied instead of directly varying the space reduction amounts for the respective characters. In this way, space reduction amounts may be varied automatically, taking the faces of the characters into account. That is, the space reduction amount is diminished (i.e. the space from the preceding character is enlarged) for a character having the minimum facing space touching the correction line, i.e. a character having a small face ("." in this example). Then, the space reduction amount is diminished for a character having a larger face width ("<" in this example).

In the first and second embodiments, the correction lines have a minimum width $g_0$. However, amounts of encroachment upon adjacent characters may be limited deliberately by storing width $g_2$ in the correction line width storage 41, and computing space reduction amounts based on width $g_2$. This is effective particularly where the same amount of encroachment is desirable in view of a certain editing mode, for example.

In the foregoing embodiments, the kerning process is performed for characters arranged horizontally. The present invention is equally applicable to a kerning process where characters are arranged vertically.

The present invention may be embodied in other specific forms without departing from the spirit or essential attributes thereof and, accordingly, reference should be made to the appended claims, rather than to the foregoing specification, as indicating the scope of the invention.

What is claimed is:

1. A kerning method for adjusting a position of an object character relative to an immediately preceding character acting as a reference character, in arranging at least two characters in a predetermined arranging direction based on imaginary bodies including faces therein, said method comprising the steps of:

(a) designating a designated facing space between the faces of said reference character and said object character;

(b) adding, as part of the faces, correction lines extending in a direction perpendicular to said arranging direction to the respective imaginary bodies of said reference character and said object character, to thereby obtain an added reference character having said correction line on the face of said reference character and an added object character having said correction line on the face of said object character;

(c) computing a minimum facing space between the faces of said added reference character and said added object character;

(d) computing a space reduction amount for said added object character with respect to said added reference character to bring said minimum facing space into agreement with said designated facing space; and (e) moving said object character toward said reference character by said space reduction amount.

2. A method as defined in claim 1, wherein the step (b) is executed to add said correction lines to middle positions in said arranging direction of the imaginary bodies of the respective characters.

3. A method as defined in claim 1, wherein the step (b) is executed to add said correction lines to middle positions in said arranging direction of the faces of the respective characters.

4. A method as defined in claim 1, further comprising the step of:

storing, for different character types, set information indicating whether said correction lines should be added to middle positions in said arranging direction of the imaginary bodies of the respective characters or to middle positions in said arranging direction of the faces of the respective characters, the step (b) being executed to add said correction lines to said reference character and said object character by referring to said set information, whereby said correction lines are added to positions determined according to the character types.

5. A method as defined in claim 1, wherein said correction lines added at the step (b) have a variable width.

6. A method as defined in claim 1, wherein the step (b) is executed to convert said reference character and said object character into dot patterns composed of a predetermined number of dots, and to add, as part of the faces, correction lines of dot patterns extending in said direction perpendicular to said arranging direction in the respective imaginary bodies of said reference character and said object character.

7. A method as defined in claim 6, wherein the step (b) is executed to add said correction lines to middle positions in said arranging direction of the imaginary bodies of the respective characters.

8. A method as defined in claim 6, wherein the step (b) is executed to add said correction lines to middle positions in said arranging direction of the faces of the respective characters.

9. A method as defined in claim 6, further comprising the step of:

storing, for different character types, set information indicating whether said correction lines should be added to middle positions in said arranging direction of the imaginary bodies of the respective characters or to middle positions in said arranging direction of the faces of the respective characters, the step (b) being executed to add said correction lines to said reference character and said object character by referring to said set information, whereby said correction lines are added to positions determined according to the character types.

10. A method as defined in claim 6, wherein said correction lines added at the step (b) have a variable width.

11. A typographic apparatus utilizing a kerning process for adjusting a position of an object character relative to an immediately preceding character acting as a reference character, in arranging at least two characters in a predetermined arranging direction based on imaginary bodies including faces therein, said apparatus comprising:

facing space designating means for designating a designated facing space between the faces of said reference character and said object character;

correction line adding means for adding, as part of the faces, correction lines extending in a direction perpendicular to said arranging direction to the respective imaginary bodies of said reference character and said object character, to thereby obtain an added reference character having said correction line on the face of said reference character and an added object character having said correction line on the face of said object character;

minimum facing space computing means for computing a minimum facing space between the faces of said added reference character and said added object character;

space reduction amount computing means for computing a space reduction amount for said added object character with respect to said added reference character to bring said minimum facing space into agreement with said designated facing space; and control means for moving said object character toward said reference character by said space reduction amount.

12. An apparatus as defined in claim 11, wherein said correction line adding means is operable to add said correction lines to middle positions in said arranging direction of the imaginary bodies of the respective characters.

13. An apparatus as defined in claim 11, wherein said correction line adding means is operable to add said correction lines to middle positions in said arranging direction of the faces of the respective characters.

14. An apparatus as defined in claim 11, further comprising set information storage means for storing, for different character types, set information indicating whether add said correction lines should be added to middle positions in said arranging direction of the imaginary bodies of the respective characters or to middle positions in said arranging direction of the faces of the respective characters, said correction line adding means being operable to add said correction lines to said reference character and said object character by referring to said set information, whereby said correction lines are added to positions determined according to the character types.

15. An apparatus as defined in claim 11, wherein said correction line adding means is operable to add correction lines having a variable width.

16. An apparatus as defined in claim 11, further comprising character data processing means for converting said reference character and said object character into dot patterns composed of a predetermined number of dots, said correction line adding means being operable to add, as part of the faces, correction lines of dot patterns extending in said direction perpendicular to said arranging direction in the respective imaginary bodies of said reference character and said object character.

17. An apparatus as defined in claim 16, wherein said correction line adding means is operable to add said correction lines to middle positions in said arranging direction of the imaginary bodies of the respective characters.

18. An apparatus as defined in claim 16, wherein said correction line adding means is operable to add said correction lines to middle positions in said arranging direction of the faces of the respective characters.

19. An apparatus as defined in claim 16, further comprising set information storage means for storing, for different character types, set information indicating whether add said correction lines should be added to middle positions in said arranging direction of the imaginary bodies of the respective characters or to middle positions in said arranging direction of the faces of the respective characters, said correction line adding means being operable to add said correction lines to said reference character and said object character by referring to said set information, whereby said correction lines are added to positions determined according to the character types.

20. An apparatus as defined in claim 16, wherein said correction line adding means is operable to add correction lines having a variable width.

* * * * *